United States Patent Office 2,700,628
Patented Jan. 25, 1955

2,700,628

SOLDERING FLUX

John A. De Rosa, Brooklyn, and Chester A. Snell, New York, N. Y., assignors to the United States of America as represented by the Secretary of the Army No Drawing. Application December 7, 1951,
Serial No. 260,574

6 Claims. (Cl. 148—23)

This invention relates to soldering fluxes and more particularly to soldering fluxes adapted for use as active but non-corrosive fluxes for soft soldering on such metals as copper, brass, and tinplate.

In many instances such as in electrical instruments and appliances, there are delicate metal surfaces which require a soldering flux that will not leave a detrimentally corrosive residue.

Heretofore, it has been found that fluxes used for soft soldering in such situations have been rosin or rosin plus active additives. Alkyd resins such as rosin modified maleic ester type resins, of which the commercially made Teglac resins are examples, have been found to be the most suitable in this respect. However, these rosin fluxes leave much to be desired as far as ease in soldering is concerned.

It is an object of this invention to provide a non-corrosive flux which is more active than rosin.

It is a further object of this invention to increase the soldering activity of maleicised rosins without leaving a detrimentally corrosive residue.

Other objects and advantages of this invention will become apparent from the following specification.

In the present invention, rosin modified maleic ester type rosins, formed from the esterification of a rosin-maleic acid condensation product with a polyhydric alcohol such as glycerine, ethylene glycol, and the like, have been rendered very active for soft soldering on such metals as copper, brass, and tinplate by incorporating into a solution consisting of an organic solvent containing the aforementioned maleicised rosins, small percentages of the halide salts of quaternary ammonium bases and amine hydrohalides. It has also been found that the addition of amyl acetate has a beneficial effect on the fluxing activity of these compositions. The fluxes resulting are non-corrosive.

Examples of halide salts of quaternary ammonium bases used to effect increased activity are ethyl dimethyl cetyl ammonium bromide and cetyl trimethyl ammonium bromide. Examples of amine hydrohalides used as activating additives are quinine hydrochloride, glutamic acid hydrochloride, and hydrazine dihydrochloride. Examples of organic solvents which can be used are ethyl and methyl alcohol.

In the following table, instances of the compositions covered by this invention are given and there is also included therein, relative fluxing activities as determined by the spreading drop test. The spreading drop test is a method devised to measure the efficacy of the soldering flux in question and it determines the area covered by the spreading of a fixed quantity of 50 Sn–50 Pb solder (about 0.5 gram) on a clean bright copper panel, on which the flux solution is brushed during 15 seconds on a hot-plate kept at 276° C. The percentage figure following each ingredient refers to the weight in grams contained in 100 ml. of solution. The activities of maleicised rosin and rosin alone are given for comparison.

| Flux No. | Composition | Solvent | Area of Solder Spread (sq. in.) |
|---|---|---|---|
| I | Rosin modified maleic ester type resin, 25%; Cetyl trimethyl ammonium bromide, 1%; Amyl acetate, 10%. | Alcohol | 0.56 |
| II | Rosin modified maleic ester type resin, 25%; Ethyl dimethyl cetyl ammonium bromide, 1%; Amyl acetate, 10%. | do | 0.55 |
| III | Rosin modified maleic ester type resin, 23%; Quinine hydrochloride, 2%; Cetyl trimethyl ammonium bromide, 0.1%. | Alcohol+Amyl acetate (1:1 by vol.). | 0.55 |
| IV | Rosin modified maleic ester type resin, 23%; Glutamic acid hydrochloride, 2%; Cetyl trimethyl ammonium bromide, 0.1%. | do | 0.44 |
| V | Rosin modified maleic ester type resin, 24%; Hydrazine dihydrochloride, 1%; Ethyl dimethyl cetyl ammonium bromide, 0.2%; Amyl acetate, 10%. | Methyl alcohol | 0.45 |
| VI | Rosin modified maleic ester type resin, 25%. | Alcohol | 0.25 |
| VII | Rosin, 25% | do | 0.18 |

These fluxes are generally prepared as follows. The rosin modified maleic ester type resin is dissolved in a volume of hot alcohol of about three fourths the final volume of solution. After the resin solution has cooled somewhat, the halide salts of the quaternary ammonium bases and the amine hydrohalides are added. Lastly, the amyl acetate is added, if it is not already part of the original solvent. The resulting solution is made up to the desired volume with additional cold solvent.

While there have been here described what at present are considered to be the preferred embodiments of the invention, it will be understood by those skilled in the art that various changes and modifications may be made herein without departing from the invention, and it is therefore aimed in the hereinafter appended claims to cover all such modifications and changes as fall within the spirit and scope of the invention.

What is claimed is:

1. An active, substantially non-corrosive soft soldering flux for such metals as copper, brass, and tinplate consisting essentially of about 25% by weight of a rosin modified maleic ester type resin, 1% by weight of cetyl trimethyl ammonium bromide, 10% by weight of amyl acetate and 64% by weight of alcohol.

2. An active, substantially non-corrosive soft soldering flux for such metals as copper, brass, and tinplate consisting essentially of about 25% by weight of a rosin modified maleic ester type resin, 1% by weight of ethyl dimethyl cetyl ammonium bromide, 10% by weight of amyl acetate and 64% by weight of alcohol.

3. An active, substantially non-corrosive soft soldering flux for such metals as copper, brass, and tinplate consisting essentially of about 23% by weight of a rosin modified maleic ester type resin, 2% by weight of quinine hydrochloride, 0.1% by weight of cetyl trimethyl ammonium bromide, said ingredients being dissolved in a solution comprised of alcohol and amyl acetate in a ratio of 1:1 by volume.

4. An active, substantially non-corrosive soft soldering flux for such metals as copper, brass, and tinplate consisting essentially of about 23% by weight of a rosin modified maleic ester type resin, 2% by weight of glutamic acid hydrochloride, 0.1% by weight of cetyl trimethyl ammonium bromide, said ingredients being dissolved in a solution comprised of alcohol and amyl acetate in a ratio of 1:1 by volume.

5. An active, substantially non-corrosive soft soldering flux for such metals as copper, brass, and tinplate consisting essentially of about 24% by weight of a rosin modified maleic ester type resin, 1% by weight of hydrazine dihydrochloride, 0.2% by weight of ethyl dimethyl cetyl ammonium bromide, 10% by weight of amyl acetate and 64.8% by weight of methyl alcohol.

6. An active substantially non-corrosive soft soldering flux for such metals as copper, brass and tin plate consisting essentially of about 23–25% by weight of a rosin modified maleic ester type resin, 0.1% to 1% by weight of a halide salt of a quaternary ammonium base selected from the group consisting of cetyl trimethyl ammonium bromide and ethyl dimethyl cetyl ammonium bromide, 1% to 2% by weight of an amine hydrochloride selected from the group consisting of quinine hydrochloride, glutamic acid hydrochloride and hydrazine dihydrochloride, and the remainder a solvent selected from the group consisting of alcohol and a mixture of alcohol and amyl acetate.

References Cited in the file of this patent

UNITED STATES PATENTS

| | | |
|---|---|---|
| 1,929,895 | McBride | Oct. 10, 1933 |
| 1,949,916 | McQuaid | Mar. 6, 1934 |
| 2,145,292 | Boyle | Jan. 31, 1939 |
| 2,429,033 | Silman et al. | Oct. 14, 1947 |
| 2,470,957 | Strader | May 24, 1949 |
| 2,612,459 | Willard et al. | Sept. 30, 1952 |

FOREIGN PATENTS

| | | |
|---|---|---|
| 471,202 | Great Britain | Aug. 31, 1937 |
| 494,906 | Great Britain | Nov. 3, 1938 |
| 557,816 | Great Britain | Dec. 7, 1943 |
| 599,805 | Great Britain | Mar. 22, 1948 |